Figure 1:
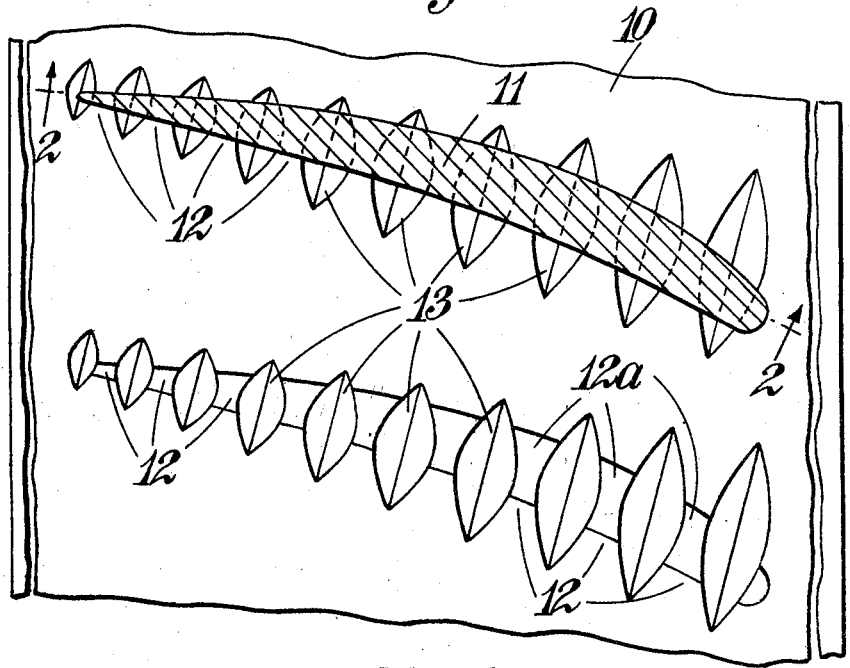

Aug. 20, 1957 C. H. PARKINSON 2,803,737
METHODS OF AND APPARATUS FOR WELDING TO PRODUCE
SIMPLE PRESSURE BUTT RESISTANCE
WELDED JOINTS
Filed Sept. 1, 1955 2 Sheets-Sheet 2

United States Patent Office 2,803,737
Patented Aug. 20, 1957

2,803,737

METHODS OF AND APPARATUS FOR WELDING TO PRODUCE SIMPLE PRESSURE BUTT RESISTANCE WELDED JOINTS

Carl Hubert Parkinson, Littleover, England, assignor to Rolls-Royce Limited, Derby, England, a British company Application September 1, 1955, Serial No. 531,897

Claims priority, application Great Britain September 8, 1954

5 Claims. (Cl. 219—107)

This invention relates to the manufacture of parts of turbo-machines and the like and will be described hereinafter as applied to the manufacture of stators or rotors of turbines or compressors.

According to the present invention, a method of producing a simple pressure butt, resistance-welded joint which can be used in the manufacture of parts of turbo-machines and the like, comprises the steps of forming in that part to be welded which would otherwise permit the more rapid heat-conduction away from the weld, grooving which tapers towards the bottom of the grooving thereby to produce a series of spaced lands which have dimensions and spacings such that the butting surface of the other part can during welding contact several lands, and which lands provide a reduced initial area of contact between the butting surfaces and also taper towards the butting surfaces, causing the said other part to bear on the spaced lands prior to the passage of welding current in such manner that the surfaces of the lands are deformed by the butting portion of said other part and full contact is obtained between the surfaces across which welding current is to pass, and during welding causing the other part to bear under pressure against the tapered spaced lands thereby to penetrate the lands against a resistance which increases with the penetration. Preferably the said other part, when being brought up into the welding position in the welding machine, is caused to come into contact with the lands with a light impact, thus "bruising" the tops of the lands and providing the necessary full contact between the butting surfaces before the welding current is switched on.

In the attachment of said blades to a turbine or compressor rotor or stator, the spaced tapered lands are formed to extend at least partly around an annual surface of the part of the rotor or stator to which blade elements are to be attached, said lands having a dimension chordwise of the blades and a spacing substantially less than the chordwise dimension of the end surface of a blade element and in the welding operation the blade elements are presented each to butt against the annual surface in a manner to be in contact with several lands during welding.

It will be appreciated that it is difficult to ensure that the end of, say, a turbine or compressor blade makes proper contact with the lands and it is found that by the bruising operation above-mentioned these difficulties are avoided. If a blade is brought up to touch the lands with no impact prior to switching on of the welding current excessive currents will pass through those lands which are in adequate contact and arcing will occur from those lands which are not in proper contact and so a defective weld may be obtained. Even if such a defective weld occurs only occasionally, it will be appreciated that in the manufacture, of, say, a turbine disc it is of considerable disadvantage because the disc must then be scrapped.

According to a feature of this invention, the first part is grooved only locally in the region in which the other part is to be attached to it so as to leave, say, a smooth surface around the weld. For instance, in say attaching turbine blades to a turbine disc the grooves may be milled or otherwise formed in local patches where the blades are to be attached to the disc by means of a milling cutter or other appropriate tool whereof the axis is skewed to the disc axis at an angle such that the centre line of the local milling corresponds approximately to the desired position for the chord of the root section of the blade to be attached to the disc. Preferably the milling or the like is effected to produce a series of parallel grooves of lenticular form which taper in depth towards their mid-length and the length of each groove is somewhat greater than the corresponding thickness of the blade at its root end. Thus, the lands between the grooves have their smallest width at their crests adjacent the mid-length of the grooves.

As one important alternative to milling the grooves, the grooves may be formed by a pressing operation, using a hardened die to produce a groove pattern at the location of the part to be welded.

According to another feature of this invention, butt-resistance-welding apparatus comprises relatively movable supports for the one part and the other part to be welded, ram or like means to urge the other part into contact with the one part, means to supply welding current to the parts, and control means for the support which carries the other part, whereby it can move to a position beyond that at which the other part first comes into contact with the lands of the one part, said ram or like means being arranged to be operated so that the blade contacts the lands with a light impact to form a depression or "bruise" in the lands conforming to the shape of the root end of the blade. Control of the degree of penetration of the blade into the lands is obtained by cutting off the welding current at the correct moment and allowing the weld to freeze, thus arresting further relative movement of blade and disc.

Figure 2:
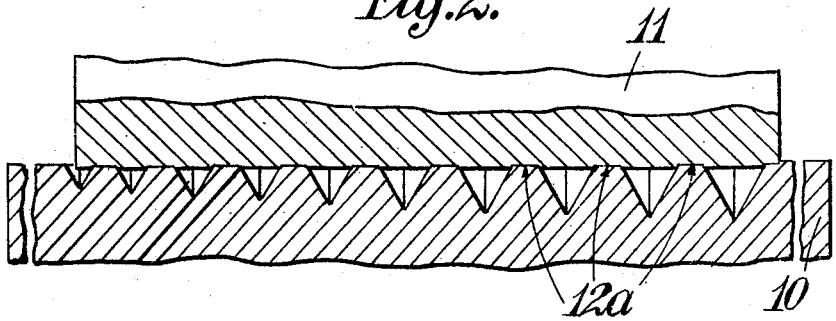
Figure 3:
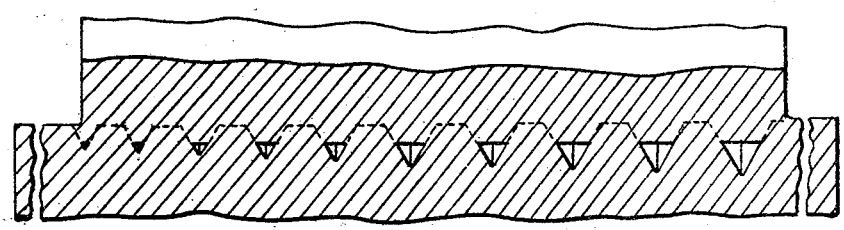
Figure 4:
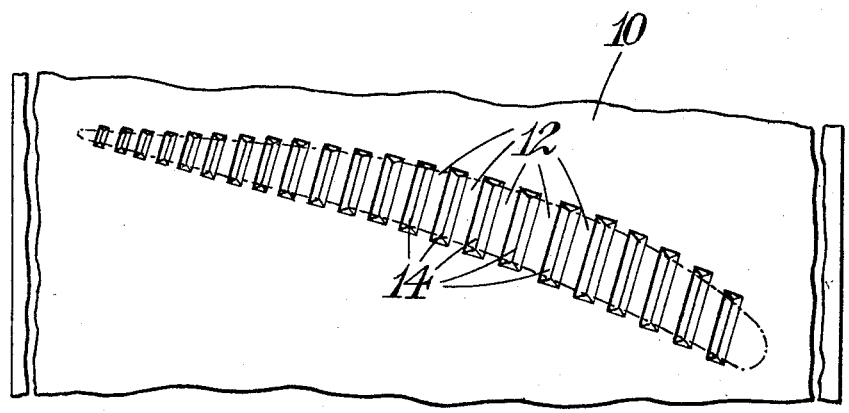
Figure 5:
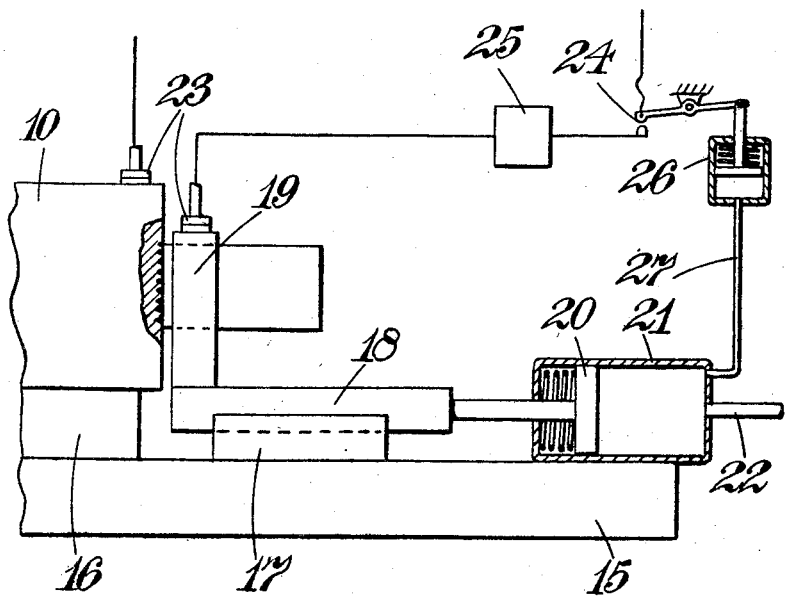

A method and an apparatus of this invention will now be described in detail with reference to the accompanying drawings, in which:

Figure 1 is a radial view on to the periphery of a rotor of a turbine or compressor, Figure 2 is a section on the line 2—2 of Figure 1 showing a blade in position for welding but before pasage of the welding current, Figure 3 is a view corresponding to Figure 2 but showing the blade welded to the rotor, Figure 4 illustrates an alternative form of the grooving to that shown in Figure 1, and Figure 5 illustrates diagrammatically a form of apparatus for carrying out the method of the invention.

Referring first to Figures 1 and 2, the rotor disc or drum is indicated at 10 and a blade which is to be attached to the disc or drum is indicated at 11.

To attach the blade 11 in position on the disc or drum 10, the disc or drum is first provided on its periphery with grooving to form a series of lands 12 against which the end of the blade 11 will abut. The grooving may be continuous peripheral grooving, but preferably as shown in the drawings the rotor periphery is grooved locally in the region in which the blades are to be attached. For instance, as shown in Figures 1 and 2, the grooves 13 are parallel grooves of generally lenticular form which taper in depth and in width from their mid-length, and the length of each groove is somewhat greater than the thickness of the abutting portion of the blade 11. These grooves 13 may be produced by a milling cutter of conical form whereof the axis is skewed to the axis of the rotor during the milling operation. Alternatively, the grooves may be formed by a pressing operation using a hardened die and such grooving is indicated at 14 in Figure 4, the lands separating the grooves again being indicated at 12.

The rotor 10 and blade element 11 are next mounted in welding apparatus such as is shown in Figure 5, and the blade is brought up into position against the rotor in such a manner that the surfaces of the lands 12 are slightly deformed thereby to obtain good contact between each land and the end of the blade 11. This may be achieved either by bringing up the blade with a light impact or with substantial pressure. The "bruising" effect obtained is illustrated in an exaggerated manner in Figure 2 where it will be seen that the portions 12a of the tops of the lands in contact with the blades are slightly depressed and have penetrated slightly into the ends of the blades. The effect is also shown in the lower part of Figure 1, where the impressions made by the blade on the lands are indicated at 12a.

Welding current is now passed through the parts whilst they are still urged together under pressure, and, after passage of the current for the correct time, the current is cut off but pressure is maintained and the weld is allowed to freeze to arrest further relative movement of the blade and rotor.

Referring now to Figure 5, a form of welding apparatus suitable for carrying out the above method is diagrammatically shown. The apparatus comprises a base 15 on which is supported a table 16 for carrying the rotor 10 and guides 17 in which a blade support 18 is slidingly engaged. The blade support 18 carries a blade clamp 19 and is connected to the piston 20 of a pneumatic ram 21 supplied with pressure air through conduit 22.

The welding current is supplied through electrodes 23 under control of a pressure-operated switch 24 and a time-controlled switch 25. The pressure operated switch 24 is controlled by a pressure sensitive device 26, shown as a piston-and-cylinder device, and the device is connected by conduit 27 to the ram 21 so as to close the switch when the pressure in the ram reaches a selected value.

The movement of the blade support 18 under action of the ram 21 relative to the table 16 is limited as described above only by freezing of the weld due to cutting off of the welding current by the time switch.

It is found that by use of the method and apparatus of this invention, the number of defective welds produced as compared with prior methods and apparatus is substantially reduced, and it will be appreciated that this is of substantial advantage in the production of bladed rotors since a defective weld of a single blade, necessitates scrapping of a complete rotor.

I claim:

1. A method of producing a simple pressure butt, resistance-welded joint comprising the steps of forming in that part to be welded which would otherwise permit the more rapid heat-conduction away from the weld, grooving which tapers towards the bottom of the grooving thereby to produce a series of spaced lands which have dimensions and spacings such that the butting surface of the other part can during welding contact several lands, and which lands provide a reduced initial area of contact between the butting surfaces and also taper towards the butting surfaces, bringing said other part into the welding position against the lands with an impact sufficient to cause bruising of the surfaces of the lands, whereby full and uniform contact is obtained between the butting surfaces of the parts, and thereafter simultaneously passing the welding current and urging said other part under pressure against the tapered spaced lands whereby the other part penetrates the lands during welding against a resistance which increases with the extent of penetration.

2. A method as claimed in claim 1, wherein the first part is grooved only locally in the region in which the other part is to be attached to it.

3. A method as claimed in claim 2, for attaching blades to a disc wherein the grooves are milled or otherwise formed in local patches where the blades are to be attached to the disc by a rotary cutting tool whereof the axis is skewed to the disc axis at an angle such that the centre line of the local milling corresponds approximately to the desired position for the chord of the root section of the blade to be attached to the disc.

4. A method as claimed in claim 3, wherein the cutting operation is effected to produce a series of parallel grooves of lenticular form which taper in depth towards their mid-length and the length of each groove is somewhat greater than the corresponding thickness of the blade at its root end.

5. A method as claimed in claim 2, for attaching blades to a disc or drum, wherein the grooves are formed by a pressing operation, using a hardened die to produce a groove pattern at the location of the part to be welded.

References Cited in the file of this patent

UNITED STATES PATENTS

| 496,890 | Moxham | May 9, 1893 |
| 1,004,795 | Lachman | Oct. 3, 1911 |
| 1,253,189 | Von Henke | Jan. 8, 1918 |
| 1,902,955 | Holmes | Mar. 28, 1933 |
| 2,476,746 | Price et al. | Sept. 21, 1947 |

FOREIGN PATENTS

| 1,066,286 | France | Jan. 20, 1954 |